US 7,961,272 B2

(12) United States Patent
Kim

(10) Patent No.: US 7,961,272 B2
(45) Date of Patent: Jun. 14, 2011

(54) LIQUID CRYSTAL DISPLAY MODULE HAVING NON-CONDUCTIVE FIRST LAMP HOLDERS AND CONDUCTIVE SECOND LAMP HOLDERS

(75) Inventor: Young-Mi Kim, Seoul (KR)

(73) Assignee: LG Display Co. Ltd., Seoul (KR)

( * ) Notice: Subject to any disclaimer, the term of this patent is extended or adjusted under 35 U.S.C. 154(b) by 129 days.

(21) Appl. No.: 11/821,419

(22) Filed: Jun. 22, 2007

(65) Prior Publication Data

US 2008/0106671 A1 May 8, 2008

(30) Foreign Application Priority Data

Nov. 6, 2006 (KR) .................. 10-2006-0109068

(51) Int. Cl.
*G02F 1/1335* (2006.01)
*G02F 1/1333* (2006.01)
*F21V 21/00* (2006.01)
(52) U.S. Cl. .............................. 349/70; 349/58; 362/378
(58) Field of Classification Search .................. 349/70, 349/61; 362/378
See application file for complete search history.

(56) References Cited

U.S. PATENT DOCUMENTS

| 7,441,921 | B2 * | 10/2008 | Park ............................ 362/221 |
| 2004/0156183 | A1 * | 8/2004 | Kim ............................ 362/31 |
| 2005/0281037 | A1 * | 12/2005 | Murakami et al. ............. 362/382 |
| 2006/0120105 | A1 * | 6/2006 | Fechner et al. ................ 362/607 |
| 2006/0146512 | A1 * | 7/2006 | Choi ................................. 362/29 |
| 2006/0279957 | A1 * | 12/2006 | Kwon et al. ................... 362/378 |
| 2007/0001626 | A1 * | 1/2007 | Park ............................... 315/312 |

FOREIGN PATENT DOCUMENTS

CN 1945786 A 4/2007

OTHER PUBLICATIONS

First Office Action issued in corresponding Chinese Patent Application No. 2007101234891; issued Dec. 5, 2008.

* cited by examiner

*Primary Examiner* — Mark A Robinson
*Assistant Examiner* — Paul C Lee
(74) *Attorney, Agent, or Firm* — Brinks Hofer Gilson & Lione

(57) ABSTRACT

A liquid crystal display module includes a liquid crystal panel and a plurality of lamps having opposite end portions, each lamp including an external electrode disposed on each end portion. A first lamp guider has a plurality of first holders, where each first holder is configured to receive and releasably retain an end portion of the respective lamp. The first lamp guider and the first holders are formed of a non-conductive material. A first common electrode includes a plurality of second holders configured to releasably retain the respective lamp and electrically couple the external electrode to an electrical source.

5 Claims, 5 Drawing Sheets

LIQUID CRYSTAL DISPLAY MODULE HAVING NON-CONDUCTIVE FIRST LAMP HOLDERS AND CONDUCTIVE SECOND LAMP HOLDERS This application claims the benefit of priority from Korean Patent Application No. 2006-0109068, filed on Nov. 6, 2006, which is hereby incorporated by reference.

TECHNICAL FIELD

The present application relates to a liquid crystal display module.

BACKGROUND

Display devices have typically used cathode-ray tubes (CRT). Various types of flat panel displays, such as liquid crystal display (LCD) devices, plasma display panels (PDP), field emission displays, and electro-luminescence displays (ELD), have been studied as a replacement for the CRT display. LCD devices have advantages over flat panel displays, including high resolution, light weight, thin profile, compact size, and low power supply requirements.

In general, an LCD device includes two substrates that are spaced apart and face each other with a liquid crystal material interposed between the two substrates. The two substrates include electrodes that face each other. A voltage applied between the electrodes induces an electric field across the liquid crystal material. Alignment of the liquid crystal molecules in the liquid crystal material changes in accordance with the intensity of the induced electric field, thereby changing the light transmissivity of the LCD device. Thus, the LCD device displays images by varying the intensity of the induced electric field.

The LCD device includes a backlight to facilitate displaying of images. According to the arrangement of the backlight, the LCD device is categorized as an edge-type or a direct-type. The backlight of the edge-type LCD device is arranged at a side of the LCD device, and the backlight of the direct-type LCD device is arranged below a liquid crystal panel. Further, the backlight may be categorized as a cold cathode fluorescent lamp (CCFL), an external electrode fluorescent lamp (EEFL) and a non-electrode type lamp. The CCFL has internal electrodes, and the EEFL has external electrodes.

FIG. 1 is a cross-sectional view illustrating a direct-type LCD module having EEFLs according to the related art. The LCD module includes a liquid crystal panel 10, a backlight assembly 20, a main support 30, a top case 40 and a bottom case 50. The liquid crystal panel 10 includes first and second substrates 12 and 14 and a liquid crystal layer between the two substrates 12 and 14. The backlight assembly 20 includes a reflecting sheet 22 on the bottom case 50, a plurality of EEFLs 24 on the reflecting sheet 22 and a plurality of optical sheets 26. The main support 30 supports the backlight assembly 20 and the liquid crystal panel 10 sequentially placed therein. The top case 40 presses against and fixes a peripheral portion of the liquid crystal panel 10 and is coupled with the bottom case 50. Each EEFL 24 includes a lamp tube and two external electrodes, each at opposite end portions of the lamp tube. The two external electrodes are supplied with lamp driving voltages from corresponding common electrodes.

FIG. 2 is perspective view illustrating a coupling structure of EEFLs and a common electrode in an LCD module according to the related art. The coupling structure at one of the end portions of the EEFLs is shown in FIG. 2, which is the same as the coupling structure at the other end. Each EEFL 24 has two external electrodes 28 on outer surfaces of each of the end portions of a lamp tube. A pair of common electrodes 23 are located at each end portion of the EEFLs 24 and are connected to the corresponding external electrodes 28. The common electrode 23 includes a base portion, a plurality of lamp holders 27 and a plurality of stoppers 25. The base portion includes first and second lines 29a and 29b. Three lamp holders 27a, 27b and 27c corresponding to the external electrode of each EEFL 24 fixes the EEFL and supplies a common voltage to the EEFL. The stopper 25 prevents the EEFL 24 from moving in an axial direction of the EEFL 24.

As described above, at least three lamp holders are used to firmly fix the external electrode of the EEFL. Accordingly, a contact area of the lamp holders and the external electrode is large. This causes current flowing on the common electrode to increase. Accordingly, power consumption increases and current leakage may occur.

SUMMARY

A liquid crystal display module includes a liquid crystal panel and a plurality of lamps having opposite end portions, where each lamp includes an external electrode disposed on each end portion. A first lamp guider has a plurality of first holders, where each first holder is configured to receive and releasably retain an end portion of the respective lamp. The first lamp guider and the first holders are made of a non-conductive material. A first common electrode includes a plurality of second holders configured to releasably retain the respective lamp and electrically couple the external electrode to an electrical source.

DETAILED DESCRIPTION

Figure 1:
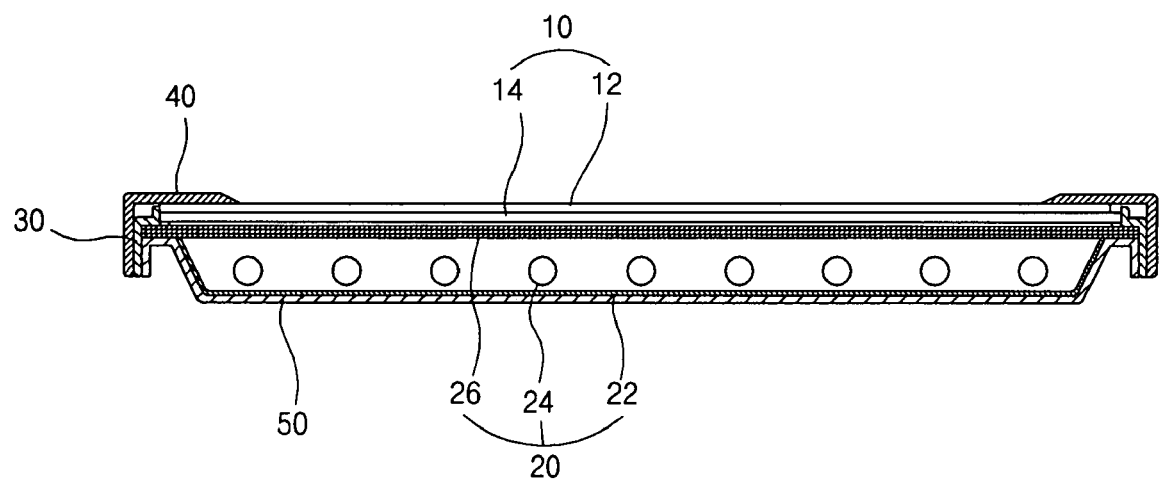
FIG. 1 is a cross-sectional view illustrating a direct-type LCD module having EEFLs according to the related art.
Figure 2:
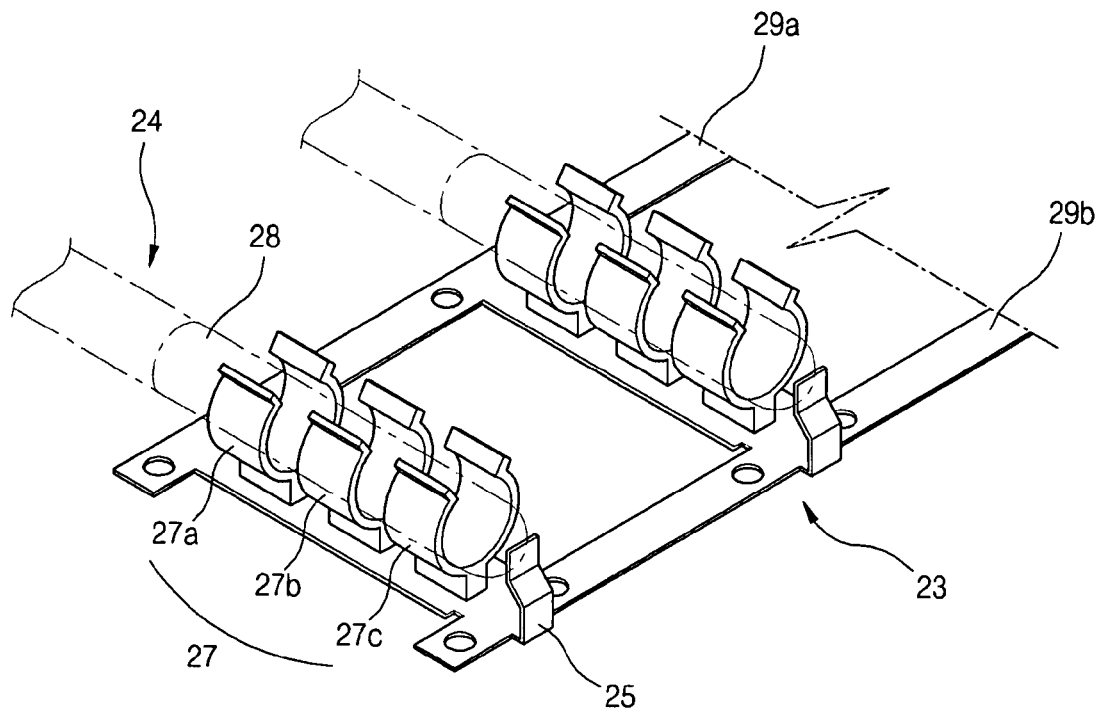
FIG. 2 is perspective view illustrating a coupling structure of EEFLs and a common electrode in an LCD module according to the related art.
Figure 3:
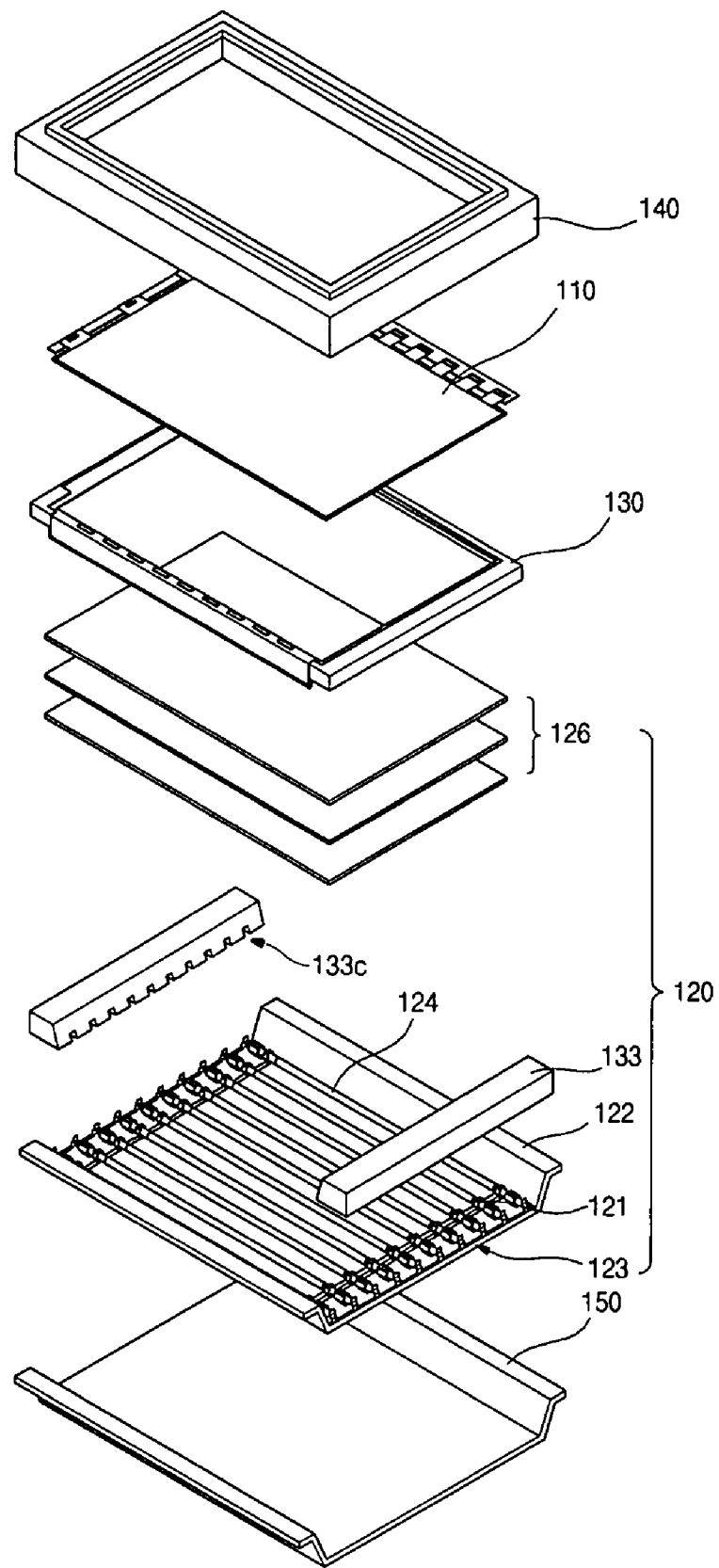
FIG. 3 is a perspective view illustrating an LCD module according to an embodiment.
Figure 4:
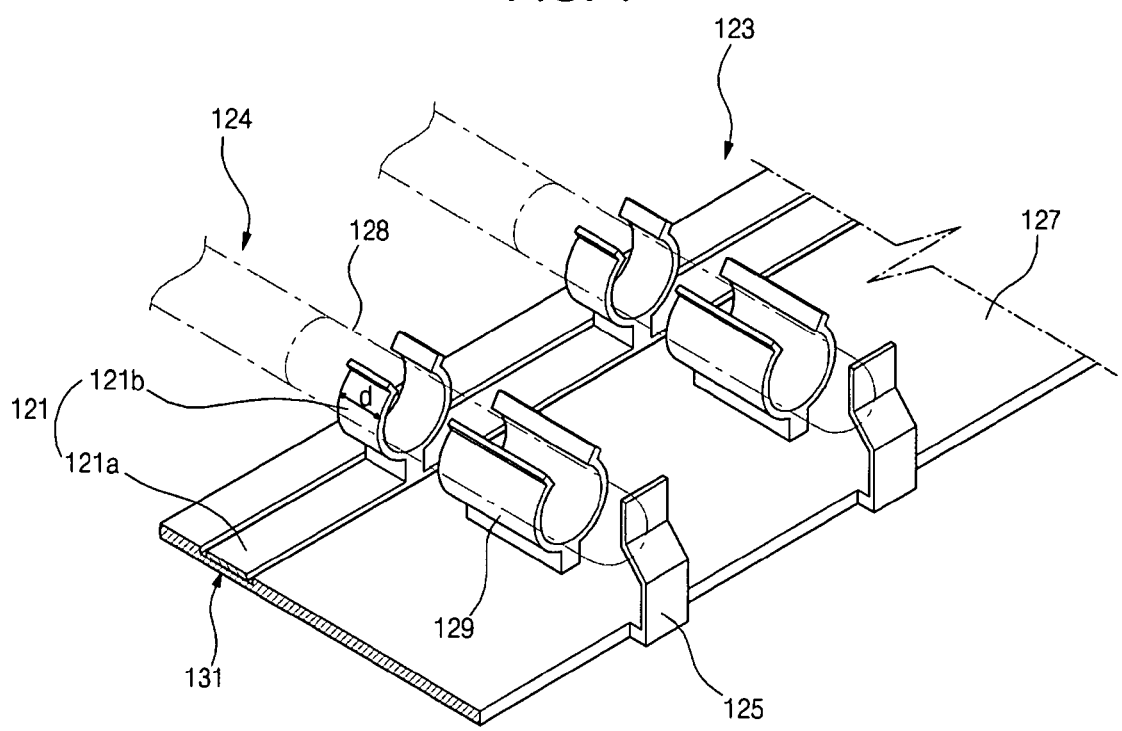
FIG. 4 is a perspective view illustrating a coupling structure of EEFLs and a lamp guider in an LCD module according to an embodiment.

The embodiments may be better understood with reference to the drawings, and these examples are not intended to be of a limiting nature. FIG. 3 is a perspective view illustrating an LCD module, and FIG. 4 is a perspective view illustrating a coupling structure of EEFLs and a lamp guider in an LCD module. The coupling structure at one of the end portions of the EEFLs is shown in FIG. 4, which is the same as the coupling structure at the other end portion of the EEFLs.

The LCD module includes a liquid crystal panel 110, a backlight assembly 120, a main support 130, a top case 140 and a bottom case 150. The main support 130 may have a rectangular frame shape. The main support 130 supports the backlight assembly 120 and the liquid crystal panel 110 sequentially placed therein. The main support 130 is coupled to the top case 140.

The backlight assembly 120 includes a plurality of EEFLs 124, a reflecting sheet 122, and a plurality of optical sheets 126, such as a prism sheet and a diffusing sheet. The EEFLs 124 are arranged in parallel below the liquid crystal panel 110 to supply light to the liquid crystal panel 110.

The top case 140 is located on the top of the liquid crystal panel 110. The top case 140 presses against and fixes a peripheral portion of the liquid crystal panel 110. The bottom case 150 is located at a bottom of the LCD module. The bottom case 150 is coupled to the top case 140. A printed circuit board (not shown) having driving circuits is connected to the liquid crystal panel 110.

Each EEFL 124 has two external electrodes 128, each located at opposite end portions of the EEFL 124. The EEFL 124 may be a glass tube-type lamp. The lamp tube may contain a discharge gas, such as mercury (Hg). An inner surface of the lamp tube may be coated with fluorescent material.

A pair of lamp guiders 123 are located at opposite end portions of the EEFLs 124, and support and fix the EEFLs 124. The one external electrode 128 of the EEFL 124 are coupled with one of the lamp guiders 123, and the other external electrodes 128 of the EEFL 124 are coupled with the other of the lamp guiders 123.

A pair of side supporters 133 includes a plurality of recesses 133c corresponding to the plurality of EEFLs 124, respectively. The side supporters 133 press against the EEFLs 124 and the lamp guiders 123, and firmly fix the EEFLs 124 at both end portions. The side supporters 133 are coupled to the bottom case 150. The external electrodes 128 of the EEFL 124 are supplied with lamp driving voltages from corresponding common electrodes 121.

The lamp guider 123 includes a first base portion 127, a plurality of first holders 129 disposed on the first base portion 127, and a plurality of stoppers 125. The lamp guider 123 and all components of the lamp guider are also made of a non-conductive material. The first base portion 127 may have a groove 131 running transverse to an axis of the EEFLs 124. The plurality of first holders 129 may be arranged in parallel to the groove 131, and correspond to the plurality of EEFLs 124, respectively. The plurality of stoppers 125 may be located at an outer side of the lamp guider 123, and each pair of stoppers is arranged along the axis of the respective EEFL 124. The stopper 125 faces the corresponding end of the EEFL 124 and prevents the EEFL 124 from moving in a length direction of the EEFL 24.

A common electrode 121 includes a second base portion 121a and a plurality of second holders 121b on the second base portion 121a. The second base portion 121a may be disposed in the groove 131. The plurality of second holders 121b may be arranged along the second base portion 121a and correspond to the plurality of EEFLs 124, respectively. The common electrode 121 is made of a conductive material to electrically couple a lamp driving voltage to the corresponding external electrodes 128. Because the common electrode 121 is connected to the corresponding external electrodes 128 of all the EEFLs 124, one inverter is connected to the common electrode 121, which supplies the lamp driving voltage to the corresponding external electrodes 128 of all the EEFLs 124.

The first and second holders 129 and 121b and the stopper 125 corresponding to each EEFL 124, are arranged along the axis of each EEFL 124, and are spaced apart from each other. The first and second holders 129 and 121b have an open-ring shape and are configured to receive the corresponding EEFL 124. Open portions of the first and second holders 129 and 121b elastically widen and narrow when the EEFL 124 is coupled with the first and second holders 129 and 121b. Thus, the EEFLs 124 may be easily inserted into and removed from the first and second holders 129 and 121b.

The first and second holders 129 and 121b firmly fix the corresponding EEFL 124 and prevent the EEFL 124 from moving or being damaged by an external impact. Further, the second holder 121b contacts the corresponding external electrode 128 to supply the lamp driving voltage to the corresponding external electrodes 128. As described above, the first holder 129 formed of non-conductive material fixes the EEFL 124, while the second holder 121b, which is formed of conductive material, also fixes the EEFL 124 and additionally supplies the lamp driving voltage. Accordingly, a contact area of the external electrode and the common electrode 121 is minimized. This reduces current flowing through the common electrode, and thus reduces power consumption and leakage current.

The second holder 121b may have a width "d" of about 1 mm to 2 mm. When the width "d" is less than about 1 mm, the power supplied may be not sufficient to excite electrons in the EEFL 124, and the EEFL 124 may not radiate. When the width "d" is more than about 2 mm, power consumption may increase. The width "d" may vary according to a length of the EEFL 124.

Figure 5:
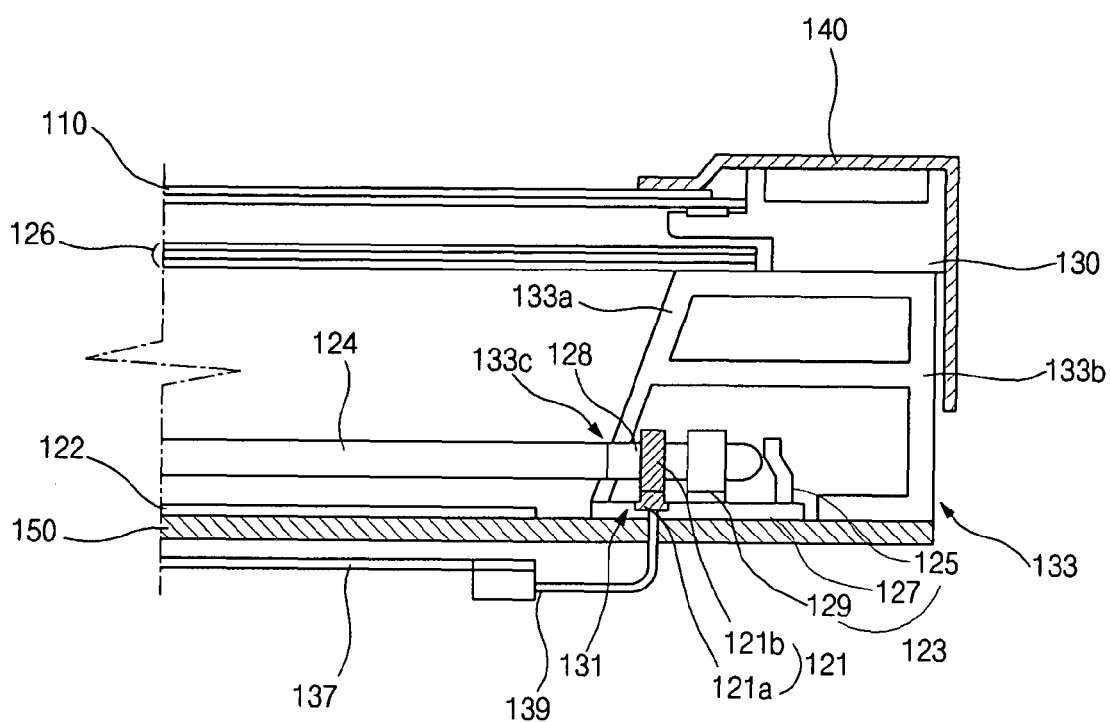
FIG. 5 is a cross-sectional view illustrating an LCD module according to an embodiment.

FIG. 5 is a cross-sectional view illustrating an LCD module. A reflecting sheet 122 and a plurality of optical sheets 126 are located in the LCD module. A plurality of EEFLs 124 are located on the reflecting sheet 122. The EEFL 124 is fixed by the first and second holders 129 and 121b, and is supplied with a lamp driving voltage through the second holder 121b. A stopper 125 prevents the EEFL 124 from moving.

A side supporter 133 fixes and supports the EEFL 124 and a lamp guider 123. A liquid crystal panel 110 is supported by the main support 130. A bottom case 150 is located at a bottom portion of the LCD module. A top case 140 presses against a peripheral portion of the liquid crystal panel 110, and is coupled to the main support 130 and the bottom case 150.

A lamp driving circuit 137 is connected to the EEFLs 124 through a lead line 139 and a base portion 121a of a common electrode 121. The lamp driving circuit 137 is located on a bottom surface of the bottom case 150. The side supporter 133 covers end portions of the EEFLs 124. The side supporter 133 has an inner side 133a and an outer side 133b. The inner side 133a may be inclined, and the outer side 133b may be vertical. The inner side 133a has a plurality of recesses 133c corresponding to the plurality of EEFLs 124, respectively. The recesses 133c receive the corresponding EEFLs 124. Portions between the recesses 133c may press against a first base portion 127 of the lamp guider 123. Accordingly, the EEFLs 124 and the lamp guider 123 can be firmly fixed.

As described above, the second holder fixes the EEFL in place and further supplies the lamp driving voltage to the corresponding external electrode, while the first holder formed of non-conductive material fixes the EEFL in place. The contact area of the external electrode and the common electrode is minimized, and thus power consumption and leakage current can be reduced.

For purposes of brevity in the description above, a structure at only one end portions of EEFLs is shown. However, a structure at the other end portions of the EEFLs is similar to the description at the one end portions of the EEFLs. That is, at the other end, a second common electrode includes a plurality of third holders wherein one of the plurality of third holders corresponds to the external electrode at the other end portion of one of the lamps. A second lamp guider includes a plurality of fourth holders wherein one of the plurality of fourth holders corresponds to the other end portion of one of the lamps.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display module, comprising:
   a liquid crystal panel;
   a plurality of lamps having opposite end portions, each lamp including an external electrode disposed on each end portion;
   a first lamp guider having a first base portion and a plurality of first holders, the first base portion including a plate portion and a groove portion, the groove portion having a groove disposed transverse to an axis of the lamps, the plurality of first holders disposed on the plate portion, each first holder configured to receive and releasably retain an end portion of the respective lamp, the first lamp guider and the first holders formed of a non-conductive material;
   a first common electrode on the groove portion including a second base portion and a plurality of second holders, the second base portion disposed in the groove, the plurality of second holders configured to releasably retain the respective lamp and electrically couple the external electrode to an electrical source, the plurality of second holders formed of a conductive material and the second holders disposed on the second base portion, wherein each second holder has a width, along the axis of the lamp, of about 1 mm to 2 mm and wherein the second holder is disposed closer to a center of the longitudinal direction of the lamp than the first holder.

2. The module according to claim 1, wherein the first lamp guider further includes a plurality of stoppers, each of the stoppers facing an end portion of a respective lamp.

3. The module according to claim 1, further comprising a side support including a plurality of recesses, each of the recesses corresponding to respective end portions of the lamps.

4. The module according to claim 3, wherein a portion of the side support between the recesses contacts the first lamp guider.

5. The module according to claim 1, further comprising:
   a second common electrode including a plurality of third holders, one of the plurality of third holders corresponding to the external electrode at the other end portion of one of the plurality of lamps; and
   a second lamp guider including a plurality of fourth holders, one of the plurality of fourth holders corresponding to the other end portion of the one of the plurality of lamps.

* * * * *